United States Patent
Wang et al.

(10) Patent No.: US 11,070,756 B2
(45) Date of Patent: Jul. 20, 2021

(54) METHOD, DEVICE AND SYSTEM FOR IMAGE ACQUISITION CONTROL

(71) Applicant: TuSimple, Inc., San Diego, CA (US)

(72) Inventors: Ming Wang, Beijing (CN); Jie Sun, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 0 days.

(21) Appl. No.: 16/250,823

(22) Filed: Jan. 17, 2019

(65) Prior Publication Data
US 2019/0230303 A1    Jul. 25, 2019

(30) Foreign Application Priority Data
Jan. 24, 2018   (CN) .......................... 201810066893.8

(51) Int. Cl.
*H04N 5/235*     (2006.01)
*H04N 5/369*     (2011.01)
*G06K 9/32*      (2006.01)
*G06N 3/08*      (2006.01)
*B60W 40/02*     (2006.01)
*H04N 5/33*      (2006.01)
(Continued)

(52) U.S. Cl.
CPC ........ *H04N 5/36965* (2018.08); *B60W 40/02* (2013.01); *G06K 9/00684* (2013.01); *G06K 9/20* (2013.01); *G06K 9/3233* (2013.01); *G06N 3/08* (2013.01); *H04N 5/2353* (2013.01); *H04N 5/33* (2013.01); *B60W 2420/403* (2013.01); *B60W 2555/20* (2020.02)

(58) Field of Classification Search
None
See application file for complete search history.

(56) References Cited

U.S. PATENT DOCUMENTS

| 6,975,923 B2 | 12/2005 | Spriggs |
| 7,742,841 B2 | 6/2010 | Sakai et al. |

(Continued)

FOREIGN PATENT DOCUMENTS

| CN | 102590821 A | 7/2012 |
| CN | 204314826 U | 5/2015 |

(Continued)

OTHER PUBLICATIONS

Takuya Yoda, et al. Dynamic Photometric Stereo Method Using a Mlti-Tap CMOS Image Sensor. 23rd international Conference on Pattern Recognition (ICPR) Dec. 8, 2016. pp. 2356-2361.
(Continued)

*Primary Examiner* — Christopher G Findley
(74) *Attorney, Agent, or Firm* — Paul Liu; Perkins Coie, LLP

(57) ABSTRACT

The present disclosure provides a method and an apparatus for image capturing control and a system for image capturing. The method includes: receiving environment information transmitted from one or more sensors; determining a current environment type based on the environment information; determining whether the current environment type is a predetermined harsh environment type; and controlling one or more Time-of-Flight (TOF) cameras to capture an image when it is determined that the current environment type is the harsh environment type.

15 Claims, 3 Drawing Sheets

(51) Int. Cl.
*G06K 9/00* (2006.01)
*G06K 9/20* (2006.01)

(56) References Cited

U.S. PATENT DOCUMENTS

| | | |
|---|---|---|
| 8,346,480 B2 | 1/2013 | Trepagnier et al. |
| 8,706,394 B2 | 4/2014 | Trepagnier et al. |
| 8,718,861 B1 | 5/2014 | Montemerlo et al. |
| 8,983,708 B2 | 3/2015 | Choe et al. |
| 9,088,744 B2 | 7/2015 | Grauer et al. |
| 9,214,084 B2 | 12/2015 | Grauer et al. |
| 9,219,873 B2 | 12/2015 | Grauer et al. |
| 9,282,144 B2 | 3/2016 | Tebay et al. |
| 9,317,033 B2 | 4/2016 | Ibanez-guzman et al. |
| 9,347,779 B1 | 5/2016 | Lynch |
| 9,418,549 B1 | 8/2016 | Kang et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,690,290 B2 | 6/2017 | Prokhorov |
| 9,701,023 B2 | 7/2017 | Zhang et al. |
| 9,712,754 B2 | 7/2017 | Grauer et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,739,609 B1 | 8/2017 | Lewis |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 10,009,554 B1 | 6/2018 | Miao |
| 2008/0174685 A1 | 7/2008 | Shan |
| 2010/0265346 A1 | 10/2010 | Izuka |
| 2011/0247031 A1 | 10/2011 | Jacoby |
| 2012/0281133 A1 | 11/2012 | Teppei |
| 2013/0057740 A1 | 3/2013 | Takaiwa |
| 2016/0259057 A1* | 9/2016 | Ito ............... G02B 7/28 |
| 2016/0334230 A1 | 11/2016 | Ross et al. |
| 2018/0202822 A1 | 7/2018 | DeLizio et al. |
| 2018/0284224 A1* | 10/2018 | Weed ............ G01S 7/4817 |
| 2019/0064800 A1* | 2/2019 | Frazzoli ......... G05D 1/0223 |
| 2019/0204423 A1* | 7/2019 | O'Keeffe ........ G01S 7/4817 |
| 2020/0084361 A1 | 3/2020 | Xu et al. |

FOREIGN PATENT DOCUMENTS

| | | |
|---|---|---|
| CN | 205230349 U | 5/2016 |
| CN | 106826833 A | 6/2017 |
| CN | 107229625 A | 10/2017 |
| KR | 100802511 B1 | 2/2008 |
| KR | 100917012 B1 | 9/2009 |
| WO | 2014166245 A1 | 10/2014 |
| WO | 2017089596 A1 | 6/2017 |
| WO | 2020055833 A1 | 3/2020 |

OTHER PUBLICATIONS

Chinese Application No. 201810066893.8 Office Action dated Oct. 31, 2019.
International Application No. PCT/US2019/050364 International Search Report and Written Opinion dated Dec. 26, 2019. (9 pages).
Takuya Yoda, et al. Dynamic Photometric Stereo Method Using a Multi-Tap CMOS Image Sensor. 23rd international Conference on Pattern Recognition (ICPR) Dec. 8, 2016. pp. 2356-2361.
No Author. Chinese Application No. 201810066893.8 Office Action dated Oct. 31, 2019, pp. 1-6.
No Author. Chinese Application No. 201810066893.8 Notification to Grant Patent Right for Invention, dated May 19, 2020, pp. 1-2.
Koshiro Moriguchi et al. Time-of-Flight Range Image Sensor Based on Exposure Coding with a Multi-aperture Imaging System. 2016 by ITE transaction on a Media Technology and Applications (MTA), vol. 4, No. 1, 2016, (pp. 78-83).

* cited by examiner

METHOD, DEVICE AND SYSTEM FOR IMAGE ACQUISITION CONTROL

PRIORITY CLAIM AND RELATED APPLICATION

This U.S. patent document claims the priority of and the benefits of Chinese Patent Application No. 201810066893.8 of the same title and content that was filed by Applicant Beijing Tusen Weilai Technology Co., Ltd. at the State Intellectual Property Office of China (SIPO) on Jan. 24, 2018, which was published under the Publication No. 108270970 on Jul. 10, 2018.

TECHNICAL FIELD

The present disclosure relates to image capturing technology, and more particularly, to a method and an apparatus for image capturing control and a system for image capturing.

BACKGROUND

Cameras are widely used with the development of technical fields, such as unmanned aerial vehicles, unmanned ships, self-driving, Virtual Reality (VR), three-dimensional scanning, robotic obstacle avoidance and Simultaneous Localization And Mapping (SLAM). The biggest disadvantage of ordinary cameras is it may be affected by environmental conditions. When natural illumination is too strong or too weak, the cameras could have low imaging qualities, especially in harsh environments with poor natural lightings such as heavy rain, blizzard, heavy fog, sandstorm and severe haze.

SUMMARY

The present disclosure provides a method and an apparatus for image capturing control and a system for image capturing.

In a first aspect, according to embodiments of the present disclosure, a method for image capturing control is provided. The method includes: receiving environment information transmitted from one or more sensors; determining a current environment type based on the environment information; determining whether the current environment type is a predetermined harsh environment type; and controlling one or more Time-of-Flight (TOF) cameras to capture an image when it is determined that the current environment type is the harsh environment type.

In a second aspect, according to embodiments of the present disclosure, an apparatus for image capturing control is provided. The apparatus includes a Field—Programmable Gate Array (FPGA); the FPGA includes a Input Output Block (IOB), and one or more Configurable Logic Block (CLB); the IOB and the CLB are connected via interconnects, and the CLBs are connected via interconnects, the IOB includes a receiving unit configured to receive environment information transmitted from one or more sensors; the one or more CLB include a determining unit configured to determine a current environment type based on the environment information; and a control unit configured to determine whether the current environment type is a predetermined harsh environment type, and control one or more TOF cameras to capture an image when it is determined that the current environment type is the harsh environment type.

In a third aspect, according to embodiments of the present disclosure, a system for image capturing is provided. The system includes one or more ordinary cameras, one or more TOF cameras and an apparatus for image capturing control. The apparatus for image capturing control is configured to: receive environment information transmitted from one or more sensors; determine a current environment type based on the environment information; determine whether the current environment type is a predetermined harsh environment type; and control the one or more TOF cameras to capture an image when it is determined that the current environment type is the harsh environment type, or control the one or more ordinary cameras to capture an image when it is determined that the current environment type is not the harsh environment type. The one or more ordinary cameras are configured to capture an image under control of the apparatus for image capturing control. The one or more TOF cameras are configured to capture an image under control of the apparatus for image capturing control.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

How to capture clear images in harsh environments has become a technical problem to be solved in the related technical field. The embodiments of the present disclosure provides a method and an apparatus for image capturing control and a system for image capturing, capable of solving the technical problem in the related art associated with the difficulty in capturing clear images in harsh environments.

With the solutions according to some embodiments of the present disclosure, a current environment type is determined based on environment information transmitted from one or more sensors. One or more TOF cameras is controlled to capture an image when the current environment type is a harsh environment type. The one or more TOF cameras may provide a Depth-of-Field (DOF) map using a Complementary Metal Oxide Semiconductor (CMOS), i.e., image sensor, pixel array and an active modulation light source technology. Modulated infrared light is continuously emitted to a target object, and the image sensor is used to receive the light reflected from the target object to detect the time of flight of the light pulse, so as to obtain the distance of the target object. The TOF camera may not only detect objects with small areas (such as lines, cone objects, etc.), but also have features such as long-distance ranging, high resolution, quick response and invulnerability to ambient light. Therefore, with the solution of embodiments of the present disclosure, clear images may be captured using a TOF camera when the current environment is determined to be a harsh environment, such that high-quality images may be provided to other applications and processes.

The method and apparatus for image capturing control according to the embodiments of the present disclosure may be applied to an unmanned vehicle (including a truck, a public transportation bus, a bus, a passenger car, a tractor, a sprinkler, a garbage truck, etc.), an unmanned aerial vehicle, an unmanned ship, a robot or the like. The present disclosure is not limited to any specific application scenario of the technical solutions.

Embodiment 1

Figure 1:
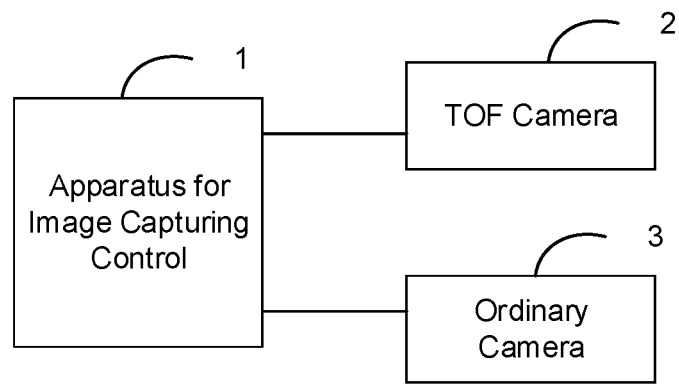
FIG. 1 is a schematic diagram showing a structure of an image capturing system according to an embodiment of the present disclosure.

Referring to FIG. 1, which is a schematic diagram showing a structure of a system for image capturing according to embodiments of the present disclosure, the system includes an apparatus 1 for image capturing control, one or more TOF cameras 2 and one or more ordinary cameras 3. For example, in the field of autonomous driving, the ordinary camera(s) and the TOF camera(s) may be mounted on the front, rear or sides of an automatic driving vehicle, and the present disclosure is not limited to any of these.

The present disclosure is not limited to any specific type or model of the ordinary camera or the TOF camera. Any of commercially available ordinary cameras or TOF cameras may be used. For example, the ordinary camera may be a monocular camera or a binocular camera.

In the following, the respective devices in the image capturing system according to the embodiment of the present disclosure will be described in detail.

The apparatus 1 for image capturing control may be configured to receive environment information transmitted from one or more sensors; determine a current environment type based on the environment information; determine whether the current environment type is a predetermined harsh environment type; and control the one or more TOF cameras 2 to capture an image when it is determined that the current environment type is the harsh environment type, or control the one or more ordinary cameras 3 to capture an image when it is determined that the current environment type is not the harsh environment type.

The TOF camera 2 may be configured to capture an image under control of the apparatus 1 for image capturing control.

The ordinary camera 3 may be configured to capture an image under control of the apparatus 1 for image capturing control.

In some embodiments of the present disclosure, the apparatus 1 for image capturing control may preconfigure camera parameters for the one or more ordinary cameras 3 via a parameter control channel. In embodiments of the present disclosure, the apparatus 1 for image capturing control may control the one or more ordinary cameras 3 to capture an image in accordance with the preconfigured camera parameters by simply transmitting a capturing instruction to the one or more ordinary cameras 3. For details, reference can be made to the related art.

In some examples of embodiments of the present disclosure, the apparatus 1 for image capturing control may control the TOF camera 2 to capture an image in accordance with any of the following schemes, Scheme A1-Scheme A3, as non-limiting examples.

Scheme A1: the apparatus 1 for image capturing control may preconfigure camera parameters for the one or more TOF cameras 2 via a parameter control channel. The apparatus 1 for image capturing control may transmit a capturing instruction to the one or more TOF camera 2. The apparatus 1 for image capturing control may receive an image captured by the TOF camera 2 in accordance with the preconfigured camera parameters in response to receiving the capturing instruction. Scheme A1 is the same as the above scheme in which the apparatus 1 for image capturing control may control the one or more ordinary camera to capture an image, and details thereof will be omitted here.

In another example, in order to meet some special requirements, for example, the one or more TOF cameras 2 may be used to capture a clear image within a target distance range. The apparatus 1 for image capturing control may control the one or more TOF cameras 2 to capture an image in accordance with the following Scheme A2.

Scheme A2: the apparatus 1 for image capturing control may determine infrared light emission time, exposure start time and exposure end time for the one or more TOF cameras 2 based on a predetermined target distance range. The apparatus 1 for image capturing control may transmit parameter control information carrying the infrared light emission time, exposure start time and exposure end time to the one or more TOF cameras 2. The apparatus 1 for image capturing control may receive an image containing an object within the target distance range as captured by the TOF camera 2 based on the parameter control information.

Preferably, when the current environment type is a slightly harsh environment type, as the ordinary camera has a certain view distance, within the range of the view distance, images captured by the ordinary camera are usable. Beyond the view distance, the TOF camera may be used to capture images. Thus, in an example of embodiments of the present disclosure, the apparatus 1 for image capturing control may control the one or more TOF cameras 2 to capture an image in accordance with the following Scheme A3.

Scheme A3: When the current environment type is a slightly harsh environment type, the apparatus 1 for image capturing control may use the above Scheme A2 to control the one or more TOF cameras to capture an image. When the current environment type is a severely harsh environment type, the apparatus 1 for image capturing control may use the above Scheme A1 to control the one or more TOF cameras to capture an image.

In some embodiments of the present disclosure, the one or more sensors connected to the apparatus 1 for image capturing control may include any one or more, or any combination, of: one or more cameras, one or more humidity sensors, one or more temperature sensors, one or more illumination sensors, one or more air quality detection sensors, one or more laser radars, one or more millimeter wave radars, one or more infrared sensors or the like.

In some embodiments of the present disclosure, when the one or more sensors include one or more cameras, the outputted environment information may include image data. When the one or more sensors include one or more humidity sensors, the outputted environment information may include humidity information. When the one or more sensor include one or more temperature sensors, the outputted environment information may include temperature information. When the one or more sensors include one or more illumination sensors, the outputted environment information may include an illumination intensity. When the one or more sensors include one or more air quality detection sensors, the outputted environment information may include haze concentration information. When the one or more sensors include one or more laser radars or one or more millimeter wave radars, the outputted environment information may include laser point cloud data.

In some embodiments of the present disclosure, the environment types may include good environment types and harsh environment types. The harsh environment types may include one or more of a blizzard environment, a heavy rain environment, a sandstorm environment, a severe haze environment and a low illumination environment.

Figure 2:
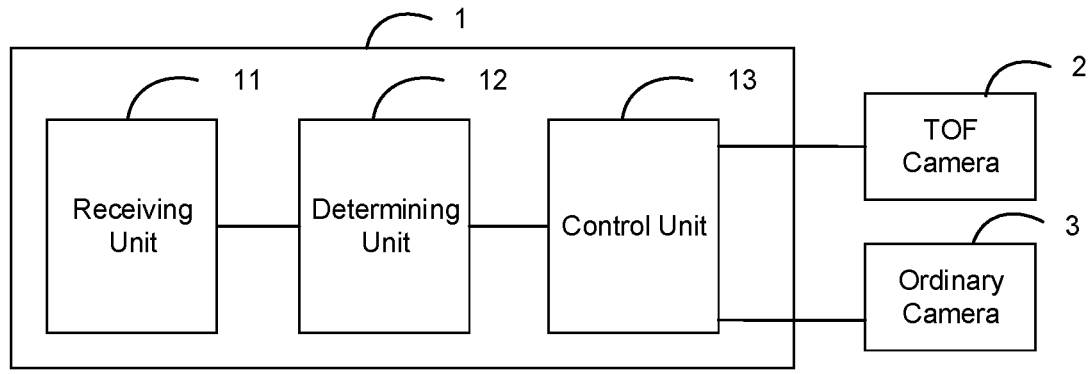
FIG. 2 is a schematic diagram showing a structure of an apparatus for image capturing control according to an embodiment of the present disclosure.

In some examples of embodiments of the present disclosure, the apparatus 1 for image capturing control may has a structure shown in FIG. 2. The apparatus 1 for image capturing control may be connected to the one or more sensors and include:

a receiving unit 11 configured to receive environment information transmitted from the one or more sensors;

a determining unit 12 configured to determine a current environment type based on the environment information; and a control unit 13 configured to determine whether the current environment type is a predetermined harsh environment type, and control the TOF camera 2 to capture an image when it is determined that the current environment type is the harsh environment type, or control the ordinary camera 3 to capture an image when it is determined that the current environment type is not the harsh environment type.

The apparatus for image capturing control may be implemented with Field—Programmable Gate Array (FPGA), and with various FPGA structures. In some examples of embodiments of the present disclosure, the apparatus for image capturing control may be implemented a structure disclosed below.

Generally, FPGAs contain an array of programmable logic blocks, and a hierarchy of reconfigurable interconnects that allow the blocks to be connected together, like many logic gates that can be inter-wired in different configurations. Logic blocks can be configured to perform complex combinational functions, or merely simple logic gates like AND and XOR. In FPGAs, logic blocks also include memory elements, which may be simple triggers (such as flip-flops) or more complete blocks of memory. FPGAs may be programmed to implement different logic functions. FPGAs use lookup tables to realize combinatorial logic. Each lookup table is connected to the input end of a trigger, and the trigger drives other logic circuits or drives I/O, thus logic blocks are enabled to realize combinatorial logic function.

In the examples of embodiments of the present disclosure, the FPGA may be configured and include logic blocks, which include an Input Output Block (IOB), and one or more Configurable Logic Block (CLB), and the logic blocks connect via interconnects. The IOB may be configured and include the receiving unit 11. The one or more CLB may be configured and include the determining unit 12 and the control unit 13.

Figure 3:
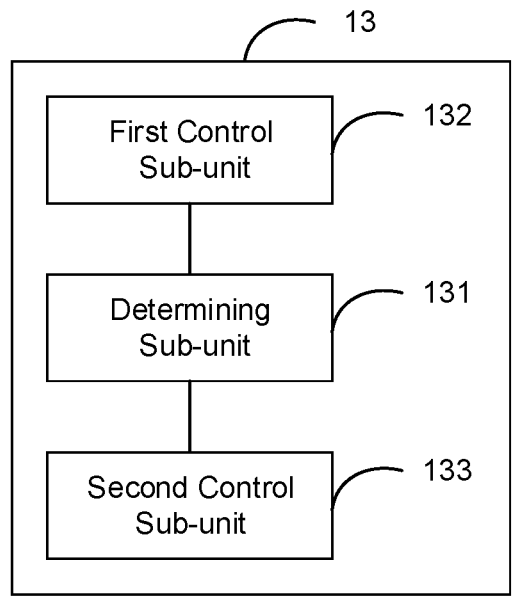
FIG. 3 is a schematic diagram showing a structure of a control unit according to an embodiment of the present disclosure.

In embodiments of the present disclosure, the control unit 13 may have a structure shown in FIG. 3. The control unit 13 includes: a determining sub-unit 131, a first control sub-unit 132 and a second control sub-unit 133.

The determining sub-unit 131 may be configured to determine whether the current environment type is the predetermined harsh environment type, and if so, triggers the first control sub-unit 132, or otherwise triggers the second control sub-unit 133.

The first control sub-unit 132 may be configured to control the one or more TOF cameras 2 to capture an image.

The second control sub-unit 133 may be configured to control the one or more ordinary cameras 3 to capture an image.

In embodiments of the present disclosure, the first control sub-unit 132 may control the one or more TOF cameras 2 to capture an image in accordance with any of the above Schemes A1, A2 and A3.

In the following, Scheme A2 will be described in detail.

In embodiments of the present disclosure, the first control sub-unit 132 may use a frequency higher than a frame rate of the TOF camera 2 to transmit the parameter control information to the TOF camera 2. It is assumed that in a time period, for the first time, the parameter control information transmitted from the first control sub-unit 132 to the one or more TOF cameras 2 carries the infrared light emission time of where $T_1$ has a predetermined initial value; for the i-th time, the parameter control information transmitted from the first control sub-unit 132 to the one or more TOF cameras 2 carries the infrared light emission time of $T_i$ where $T_i=T_1+(i-1)/f$ and f is the frequency with which the first control sub-unit 132 transmits the parameter control information to the one or more TOF cameras 2.

In embodiments of the present disclosure, the target distance range may be a range of distances from the TOF camera 2. The target distance range may be a fixed value set in the first control sub-unit 132 in advance depending on application scenarios, or a parameter value received by the first control sub-unit 132 from a client front terminal, which may be entered by an operator via an operation interface of the client front terminal. Alternatively, the target distance range may be determined by the first control sub-unit 132 based on the current environment type. The present disclosure is not limited to any specific source of the target distance range. The value of the target distance range may be set flexibly depending on actual requirements. For example, the target distance range may be set to 50-100 meters when the current environment type is a slightly harsh environment type, or to 0-50 meters when the current environment type is a severely harsh environment type. The present disclose is not limited to any specific value of the target distance range.

In embodiments of the present disclosure, in particular, the first control sub-unit 132 may include:

a calculating module configured to determine infrared light emission time, exposure start time and exposure end time for the TOF camera 2 based on a predetermined target distance range;

a control module configured to transmit parameter control information carrying the infrared light emission time, exposure start time and exposure end time to the one or more TOF cameras 2; and a receiving module configured to receive an image containing an object within the target distance range as captured by the one or more TOF cameras 2 based on the parameter control information.

In particular, the calculating module may be configured to estimate, based on a lower limit distance value of the target distance range, a first time length required for the TOF camera 2 to receive, after emitting an infrared light, the infrared light reflected by an object at a distance of the lower limit distance value; estimate, based on an upper limit distance value of the target distance range, a second time length required for the TOF camera 2 to receive, after emitting an infrared light, the infrared light reflected by an object at a distance of the upper limit distance value; and determine the exposure start time and exposure end time for the TOF camera 2 based on the predetermined infrared light emission time, the first time length and the second time length.

Assuming that the target distance range is $[d_1, d_2]$, the lower limit distance value of the target distance range may be $d_1$, in meters, and the upper limit distance value of the target distance range may be $d_2$, in meters. The first time length is denoted as $\Delta t_1$ and the second time length may be denoted as $\Delta t_2$, then $\Delta t_1 = d_1/c$, $\Delta t_2 = d_2/c$, where c is the speed of light, i.e., $3*10^8$ meters per second.

In an example, the calculating module may determine the exposure start time and exposure end time for the TOF camera 2 based on the predetermined infrared light emission time, the first time length and the second time length by: determining a sum of the infrared light emission time and the first time length as the exposure start time; and determining a sum of the infrared light emission time and the second time length as the exposure end time. Assuming that the infrared light emission time is $t_0$, the exposure start time may be denoted as $t_1$ and the exposure end time may be denoted as $t_2$, $t_1 = t_0 + 2(d_1/c)$ and $t_2 = t_0 + 2(d_2/c)$.

In another example, as it takes some time for the CMOS of the TOF camera 2 to accumulate electrical charges, if the exposure ends immediately after the light reflected by the object at the distance of the upper limit distance value reaches the COMS, there may be an underexposure for that portion of the reflected light due to insufficient accumulation of electrical charges. Hence, in an embodiment of the present disclosure, instead of stopping the exposure immediately after the light reflected by the object at the distance of the upper limit distance value reaches the COMS, the exposure may be extended for a time period (referred to as exposure extension time length hereinafter, denoted as $\Delta t$). In this case, the calculating module may determine the exposure start time and exposure end time for the TOF camera 2 based on the predetermined infrared light emission time, the first time length and the second time length by: determining a sum of the infrared light emission time and the first time length as the exposure start time; and determining a sum of the infrared light emission time, the second time length and a predetermined exposure extension time length, as the exposure end time. Assuming that the infrared light emission time is $t_0$, the exposure start time may be denoted as $t_1$, the exposure extension time length may be denoted as $\Delta t$ and the exposure end time may be denoted as $t_2$, $t_1 = t_0 + 2(d_1/c)$ and $t_2 = t_0 + 2(d_2/c) + \Delta t$. In the embodiments of the present disclosure, the value of the exposure extension time length $\Delta t$ may be obtained from experiment data or as an empirical value, and the present disclosure is not limited to this.

In embodiments of the present disclosure, the time length from the infrared light being emitted to the infrared light reaching an object at a distance $d_1$ may be $d_1/c$, the time length required for the light reflected by the object to reach the surface of the CMOS of the TOF camera 2 may be $d_1/c$. The time length from the infrared light being emitted to the infrared light reaching an object at a distance $d_2$ may be $d_2/c$, the time length required for the light reflected by the object to reach the surface of the CMOS of the TOF camera 2 may be $d_2/c$. The TOF camera 2 starts exposure upon receiving the light reflected by the object at the distance of $d_1$ on the surface of the CMOS, and stops exposure a short while after receiving the light reflected by the object at the distance of $d_2$ on the surface of the CMOS. Accordingly, when receiving light reflected by an object at a distance smaller than $d_1$ on the surface of the CMOS, the TOF camera 2 has not yet started to expose, and a shutter of the TOF camera 2 is off, such that the light reflected by the object at the distance smaller than $d_1$ may be filtered out. Similarly, when receiving light reflected by an object at a distance larger than $d_2$ on the surface of the CMOS, the TOF camera 2 has stopped exposure, i.e., the shutter of the TOF camera 2 is off, such that the light reflected by the object at the distance larger than $d_2$ may be filtered out. Therefore, with the solution according to the present disclosure, the light reflected by any object outside the target distance range may be filtered out, while keeping the light reflected by any object within the target distance range, such that the TOF camera 2 may obtain images containing objects within the target distance range but no objects outside the target distance range.

In some embodiments of the present disclosure, the determining unit 12 may be implemented in accordance with any of the following schemes, Scheme B1-Scheme B2, as non-limiting examples.

Scheme B1: The determining unit 12 may transmit the environment information to a preconfigured neural network model, and obtain the current environment type by the neural network model.

Scheme B2: The determining unit 12 may extract environmental feature information from the environment information, match the extracted environmental feature information with preconfigured environmental feature libraries for respective environment types, and determine a matched environment type as the current environment type.

In the following, the specific implementations of Scheme B1 and Scheme B2 will be described in detail.

The implementation of Scheme B1 may vary in different cases.

Figure 4A:
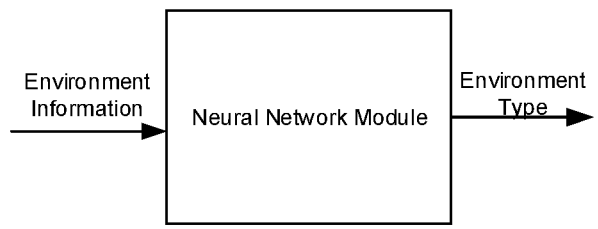
FIG. 4A is a schematic diagram showing a determining unit determining a current environment type according to an embodiment of the present disclosure.

In Case 1, one sensor is connected to the apparatus 1 for image capturing control. In Scheme B1, one neural network model corresponding to the sensor may be obtained in accordance with the following pre-processing scheme. First, a set of samples corresponding to each environment type may be established. Then, a union of the sets of samples corresponding to the respective environment types may be used as a library of samples. Finally, an initial neural network may be trained iteratively based on the library of samples (for schemes of iterative training, reference can be made to the neural network training techniques in the related art and the present disclosure is not limited thereto), so as to obtain a neural network model corresponding to the sensor and capable of determining an environment type to which the environment information inputted from the sensor belongs based on the environment information. As shown in FIG. 4A, the determining unit 12 inputs the received current environment information to the pre-trained neural network model, and obtains the current environment type.

In Case 1, the sets of samples corresponding to the respective environment types may be obtained as follows. For each environment type, a certain amount of environment information in an environment of that environment type may be collected by the sensor and the environment type to which the environment information belongs may be identified. The certain amount of environment information and the environment type to which the environment information belongs may constitutes the set of samples corresponding to the environment type. For example, when the sensor is a camera, the certain amount of environment information collected by the camera may be a certain amount of image data.

Figure 4B:
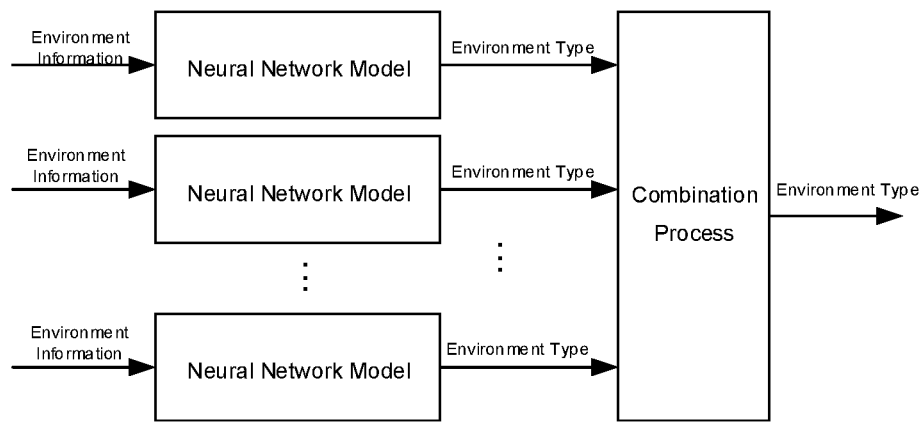
FIG. 4B is another schematic diagram showing a determining unit determining a current environment type according to an embodiment of the present disclosure.

In Case 2, there are different types of sensors connected to the apparatus 1 for image capturing control. In Scheme B1, for each of the sensors, one neural network model corresponding to that sensor may be obtained in accordance with the pre-processing scheme in Case 1 as described above (details thereof will be omitted here). As shown in FIG. 4B, the determining unit 12 inputs the received current environment information fed back from each sensor to the neural network model corresponding to that sensor, and obtains the corresponding environment type and fuses the environment types obtained by using the respective neural network models to obtain the current environment type. For example, the current environment type can be determined by a fusion process based on majority rule.

In Scheme B2, an environmental feature library corresponding to each environment type may be obtained by means of machine learning or algorithmic pre-processing. The environmental feature library corresponding to each environment type may contain feature information characterizing the environment corresponding to the environment type. For example, the environment feature library corresponding to the low illumination environment may contain feature information indicating a luminance lower than a predetermined luminance threshold. The environment feature library corresponding to the blizzard environment may contain feature information indicating snowflakes and a density of snowflakes higher than a snowflake density threshold. The environment feature library corresponding to the heavy rain environment may contain feature information indicating raindrops and a humidity value higher than a humidity threshold. This can be set by those skilled in the art depending on actual requirements and the present disclosure is not limited thereto.

In an example where the sensor is a camera and the current environment type is the blizzard environment, upon receiving an image captured by the camera, the determining unit 12 may determine a Region-of-Interest (ROI), i.e., a region having a large difference between its foreground brightness value and its background brightness value, using an ROI algorithm. The determining unit 12 may filter out image noises in the ROI and highlights dots having significant variations in grayscale intensity values in the image, and obtain a contour of a target object. The determining unit 12 may compare the contour of the target object with the feature library corresponding to each environment type, and determine the target object as a snowflake. The determining unit 12 may determine whether the density of snowflakes is higher than a predetermined snowflake density threshold, and if so (i.e., the density of snowflakes is higher than a predetermined snowflake density threshold), determine that the current environment type is the blizzard environment.

In some embodiments of the present disclosure, a TOF camera 2 may include a data processor, an infrared light emitter and an image sensor.

The data processor may be configured to receive the parameter control information containing the infrared light emission time, exposure start time and exposure end time; configure emission time of the infrared light emitter based on the infrared light emission time; and configure exposure parameters of the image sensor based on the exposure start time and exposure end time.

The infrared light emitter may be configured to emit infrared light in accordance with the infrared light emission time.

The image sensor may be configured to expose in accordance with the exposure start time and exposure end time, so as to generate image data of an object within the target distance range.

In some embodiments of the present disclosure, the data processor may transmit the image data (including brightness data and depth data of pixel points) to the apparatus for image capturing control via a Digital Video Port (DVP) or a Mobile Industry Processor Interface (MIPI). The apparatus for image capturing control may transmit the parameter control information to the data processor via a parameter control channel.

Embodiment 2

Figure 5:
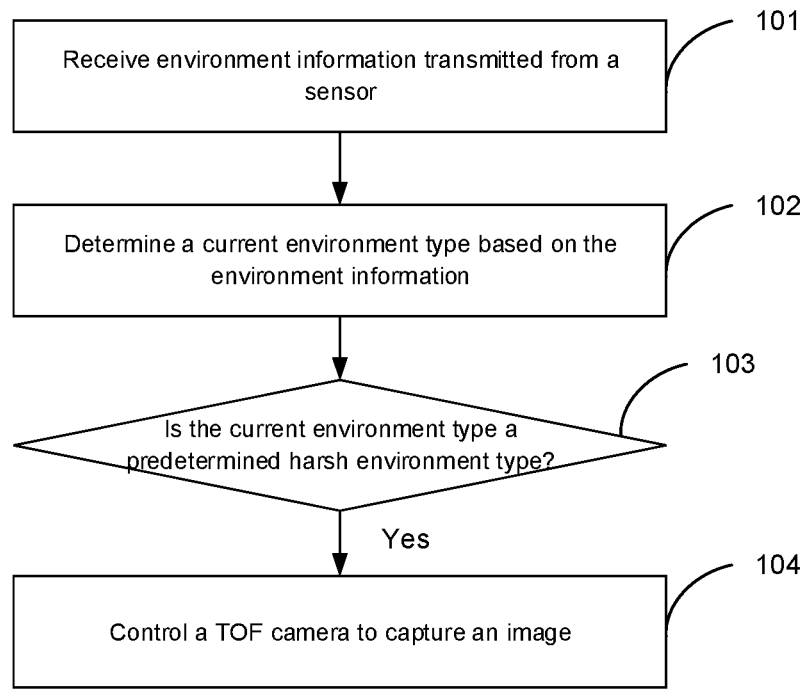
FIG. 5 is a flowchart illustrating a method for image capturing control according to an embodiment of the present disclosure.

Based on the same concept as the apparatus for image capturing control according to the above-described Embodiment 1, in Embodiment 2 of the present disclosure, a method for image capturing control is provided. FIG. 5 shows a flowchart of the method, which includes the following steps.

At step 101, receiving environment information transmitted from one or more sensors.

At step 102, determining a current environment type based on the environment information.

At step 103, determining whether the current environment type is a predetermined harsh environment type. If the current environment type is a predetermined harsh environment type, the method proceeds with step 104.

At step 104, controlling one or more TOF cameras to capture an image.

Figure 6:
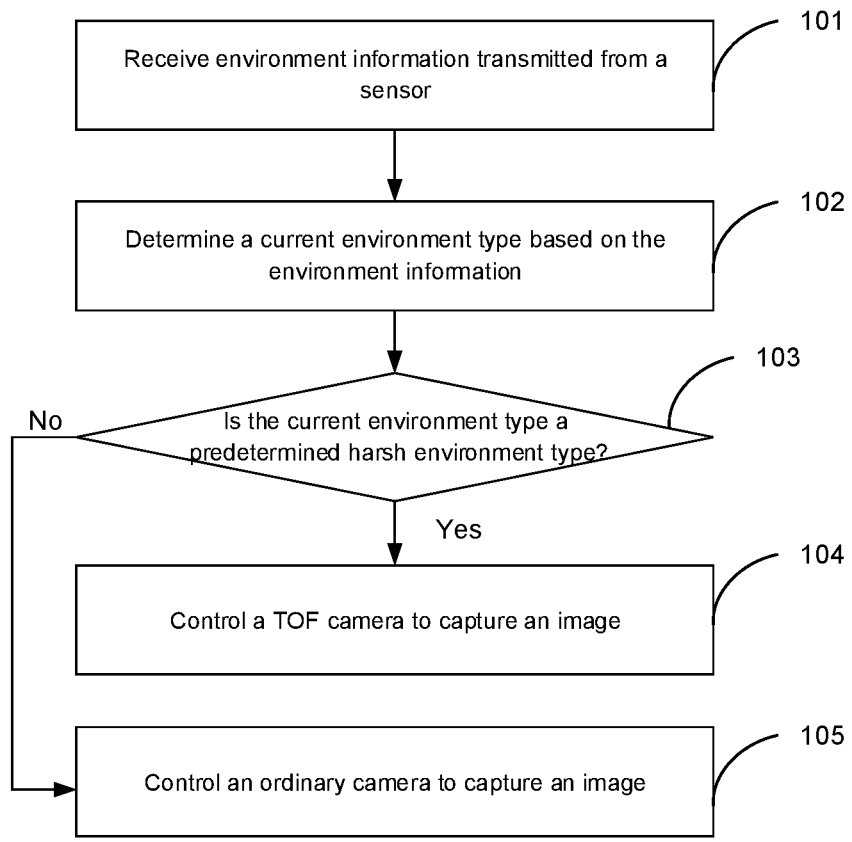
FIG. 6 is another flowchart illustrating a method for image capturing control according to an embodiment of the present disclosure.

In some embodiments of the present disclosure, the method process shown in FIG. 4 further includes a step 105, as shown in FIG. 6.

When it is determined that the current environment type is not a predetermined harsh environment type in the step 103, the method proceeds with step 105.

At step 105, controlling one or more ordinary cameras to capture an image.

In an example, the step 102 may include: transmitting the environment information to a preconfigured neural network model, and obtaining the current environment type by the neural network model. For details of the specific implementation, reference can be made to Scheme B1 in Embodiment 1 and description thereof will be omitted here.

In another example, the step 102 may include: extracting environmental feature information from the environment information; and matching the extracted environmental feature information with preconfigured environmental feature libraries for respective environment types, and determining a matched environment type as the current environment type. For details of the specific implementation, reference can be made to Scheme B2 in Embodiment 1 and description thereof will be omitted here.

Figure 7:
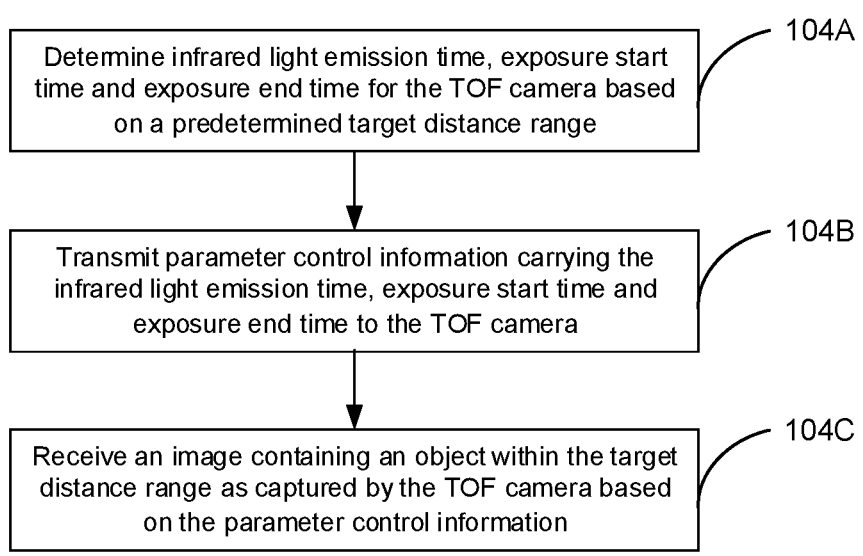
FIG. 7 is a flowchart illustrating a process of controlling a TOF camera to capture an image according to an embodiment of the present disclosure.

In an example, the step 104 of controlling the one or more TOF cameras to capture an image may be implemented with the method process shown in FIG. 7.

At step 104A, determining infrared light emission time, exposure start time and exposure end time for the one or more TOF cameras based on a predetermined target distance range.

At step 104B, transmitting parameter control information carrying the infrared light emission time, exposure start time and exposure end time to the one or more TOF cameras.

At step 104C, receiving an image containing an object within the target distance range as captured by the one or more TOF cameras based on the parameter control information.

In an embodiment of the present disclosure, for the specific implementations of the above step 104A, reference can be made to the description of the calculating module in Embodiment 1 and details thereof will be omitted here.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have been described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for image capturing control, comprising:
   receiving environment information transmitted from one or more sensors;
   extracting, based on the environment information, one or more environmental features;
   determining, using at least one preconfigured neural network model, a current environment type based on the one or more environmental features;
   determining whether the current environment type is a predetermined harsh environment type; and
   capturing an image by controlling one or more Time-of-Flight (TOF) cameras to capture the image when it is determined that the current environment type is the harsh environment type; and
   capturing an image by controlling one or more ordinary cameras when it is determined that the current environment type is not the harsh environment type,
   wherein the controlling of the one or more TOF cameras includes:
      determining a target distance range corresponding to the harsh environment type;
      estimating a first time length required for the one or more TOF cameras to receive infrared light reflected by an object at a lower limit distance of the target distance range;
      estimating a second time length required for the one or more TOF cameras to receive infrared light reflected by the object at an upper limit distance of the target distance range; and determining an exposure start time and an exposure end time for the one or more TOF cameras based on the first time length and the second time length.

2. The method of claim 1, wherein the determining the current environment type based on the one or more environmental features comprises:
matching the one or more environmental features with preconfigured environmental feature libraries for respective environment types, and determining a matched environment type as the current environment type.

3. The method of claim 2, wherein each of the preconfigured environmental feature libraries is used by a corresponding preconfigured neural network model.

4. The method of claim 1, wherein controlling the one or more TOF cameras to capture an image comprises:
transmitting parameter control information carrying an infrared light emission time, the exposure start time and the exposure end time to the one or more TOF cameras; and
receiving an image containing an object within the target distance range as captured by the one or more TOF cameras based on the parameter control information.

5. The method of claim 4, wherein the one or more TOF cameras obtains the image containing the object within the target distance range by filtering out an image outside the target distance range.

6. The method of claim 1, wherein the harsh environment type comprises one or more of a blizzard environment, a heavy rain environment, a sandstorm environment, a severe haze environment and a low illumination environment.

7. The method of claim 1, wherein the one or more sensors comprises an air quality detection sensor.

8. The method of claim 7, wherein the one or more sensors further comprises at least one of a camera, a humidity sensor, a temperature sensor, an illumination sensor, a laser radar, a millimeter wave radar or an infrared sensor.

9. The method of claim 1, wherein the target distance range includes a first target distance range corresponding to a first harsh environment type and a second target distance range corresponding to a second harsh environment type indicating a harsher environment than the first harsh environment type, and wherein the lower limit distance and the upper limit distance of the second target distance range is shorter than the lower limit distance and the upper limit distance of the first target distance range, respectively.

10. An apparatus for image capturing control, comprising:
a Field-Programmable Gate Array (FPGA) comprising:
an Input Output Block (JOB), and
one or more Configurable Logic Blocks (CLBs),
wherein the IOB and the one or more CLBs are connected via interconnects, and the one or more CLBs are connected via interconnects,
wherein the IOB comprises a receiving unit configured to receive environment information transmitted from one or more sensors, and
wherein the one or more CLBs comprises
a determining unit configured to extract, based on the environment information, one or more environmental features and determine, using at least one preconfigured neural network model, a current environment type based on the one or more environmental features; and
a control unit configured to determine whether the current environment type is a predetermined harsh environment type, and capture an image by controlling one or more Time-of-Flight (TOF) cameras to capture the image when it is determined that the current environment type is the harsh environment type, and capture an image by controlling one or more ordinary cameras when it is determined that the current environment type is not the harsh environment type,
wherein the controlling of the one or more TOF cameras includes:
determining a target distance range corresponding to the harsh environment type;
estimating a first time length required for the one or more TOF cameras to receive infrared light reflected by an object at a lower limit distance of the target distance range;
estimating a second time length required for the one or more TOF cameras to receive infrared light reflected by the object at an upper limit distance of the target distance range; and
determining an exposure start time and an exposure end time for the one or more TOF cameras based on the first time length and the second time length.

11. The apparatus of claim 10, wherein the determining unit is further configured to:
match the one or more environmental features with preconfigured environmental feature libraries for respective environment types, and
determine a matched environment type as the current environment type.

12. The apparatus of claim 10, wherein the control unit is further configured, as part of controlling the one or more TOF cameras to capture an image, to:
transmit parameter control information carrying an infrared light emission time, the exposure start time and the exposure end time to the one or more TOF cameras; and
receive an image containing an object within the target distance range as captured by the one or more TOF cameras based on the parameter control information.

13. The apparatus of claim 10, wherein the harsh environment type comprises one or more of a blizzard environment, a heavy rain environment, a sandstorm environment, a severe haze environment and a low illumination environment.

14. An image capturing system, comprising one or more ordinary cameras, one or more Time-of-Flight (TOF) cameras and an apparatus for image capturing control, wherein the apparatus for image capturing control is configured to:
receive environment information transmitted from one or more sensors;
extract, based on the environment information, one or more environmental features;
determine, using at least one preconfigured neural network model, a current environment type based on the one or more environmental features;
determine whether the current environment type is a predetermined harsh environment type; and
capture an image by controlling the one or more TOF cameras to capture the image when it is determined that the current environment type is the harsh environment type, and capture an image by controlling the one or more ordinary cameras to capture the image when it is determined that the current environment type is not the harsh environment type,
the one or more ordinary cameras are configured to capture an image under control of the apparatus for image capturing control, and the one or more TOF cameras are configured to capture an image under control of the apparatus for image capturing control by:
  determining a target distance range corresponding to the harsh environment type;
  estimating a first time length required for the one or more TOF cameras to receive infrared light reflected by an object at a lower limit distance of the target distance range;
  estimating a second time length required for the one or more TOF cameras to receive infrared light reflected by the object at an upper limit distance of the target distance range; and
  determining an exposure start time and an exposure end time for the one or more TOF cameras based on the first time length and the second time length.

15. The system of claim 14, wherein the apparatus for image capturing control is configured to control the one or more TOF cameras to capture an image by:
  transmitting parameter control information carrying an infrared light emission time, the exposure start time and the exposure end time to the one or more TOF cameras; and
  receiving an image containing an object within the target distance range as captured by the one or more TOF cameras based on the parameter control information.

* * * * *

UNITED STATES PATENT AND TRADEMARK OFFICE
CERTIFICATE OF CORRECTION

PATENT NO. : 11,070,756 B2  
APPLICATION NO. : 16/250823  
DATED : July 20, 2021  
INVENTOR(S) : Ming Wang and Jie Sun It is certified that error appears in the above-identified patent and that said Letters Patent is hereby corrected as shown below:

In the Specification

In Column 6, Line 40, delete "of where" and insert -- of $T_1$, where --, therefor.

In the Claims

In Column 13, Line 49, in Claim 10, delete "(JOB)," and insert -- (IOB), --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*